United States Patent
Nikolaus et al.

[11] Patent Number: 6,106,427
[45] Date of Patent: Aug. 22, 2000

[54] CONTINUOUSLY VARIABLE TRANSMISSION

[75] Inventors: Heinrich Nikolaus, Hamburg; Robert Paton, Passau, both of Germany

[73] Assignee: ZF Friedrichshafen AG, Friedrichshafen, Germany

[21] Appl. No.: 09/341,261

[22] PCT Filed: Jan. 10, 1998

[86] PCT No.: PCT/EP98/00115
§ 371 Date: Jul. 7, 1999
§ 102(e) Date: Jul. 7, 1999

[87] PCT Pub. No.: WO98/31954
PCT Pub. Date: Jul. 23, 1998

[30] Foreign Application Priority Data

Jan. 18, 1997 [DE] Germany ............... 197 01 642

[51] Int. Cl.⁷ ............................................. F16H 47/04
[52] U.S. Cl. ........................ 475/76; 475/72; 74/732.1
[58] Field of Search ..................... 475/76, 78, 80, 475/81, 72; 74/732.1

[56] References Cited

U.S. PATENT DOCUMENTS

| | | | |
|---|---|---|---|
| 4,170,153 | 10/1979 | Mizuno et al. | 74/868 |
| 4,852,429 | 8/1989 | Künzer et al. | 74/866 |
| 5,376,056 | 12/1994 | Wakahara et al. | 475/123 |
| 5,529,546 | 6/1996 | Ishino et al. | 475/76 |
| 5,560,203 | 10/1996 | Pollman | 60/327 |
| 5,624,339 | 4/1997 | Coutant et al. | 475/72 |
| 5,888,162 | 3/1999 | Moeller et al. | 475/72 |
| 5,980,411 | 11/1999 | Wontner | 475/76 |

FOREIGN PATENT DOCUMENTS

| | | |
|---|---|---|
| 0 352 110 A2 | 1/1990 | European Pat. Off. . |
| 0 429 517 | 3/1990 | European Pat. Off. . |
| 0 429 517 B1 | 6/1991 | European Pat. Off. . |
| 295 13 686 U1 | 2/1996 | Germany . |

*Primary Examiner*—Rodney H. Bonck
*Assistant Examiner*—Tisha D. Waddell
*Attorney, Agent, or Firm*—Davis and Bujold

[57] ABSTRACT

The invention is based on a continuously variable transmission comprising a mechanical power branch and an electronically controlled hydraulic power branch which can be adjusted via a swash plate (7), a summarizing transmission and a multi-stage transmission with hydraulically actuated, force-locking shift elements (11–14). The shift signals of the shift elements (11–14) are generally triggered when a shift or synchronizer speed is reached. Thereafter elapses a response or reaction time and an adjusting time until the shift elements (11–14) are engaged. This results in long clutch shift processes. It is proposed that the response and engagement times of the shift elements (11–14) be compensated by a control unit.

3 Claims, 3 Drawing Sheets

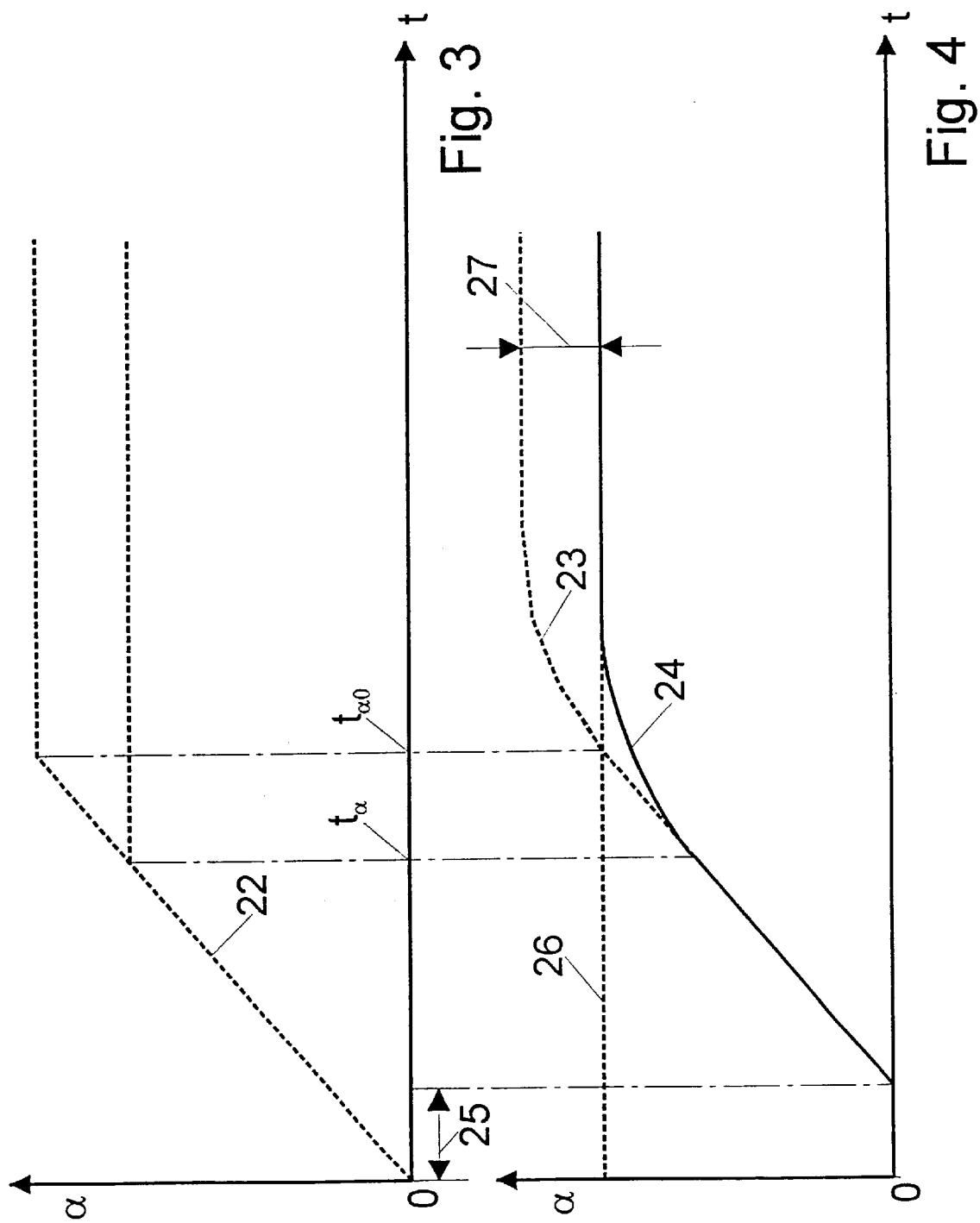

CONTINUOUSLY VARIABLE TRANSMISSION

FIELD OF THE INVENTION

The invention concerns a continuously variable transmission having the features stated in the preamble of claim 1.

BACKGROUND OF THE INVENTION

Patent EP 0 429 517 B1 has disclosed a continuously variable transmission with one hydrostatic and one mechanical power branch. In such transmissions, a summarizing transmission adds up the power of both power branches and optionally guides it via a mechanical transmission to a vehicle drive. If the mechanical power branch is interrupted by a clutch, the hydraulic power branch transmits the whole power. If the hydrostat is set to zero, the mechanical power branch transmits the whole power. Between said two operating points, the power distribution is determined by the control of the hydrostat.

The hydrostat comprises one pump and one hydrostatic motor of which at least one unit is regulatable. Pressure and flow rate or capacity in the time unit determine the power of the hydrostatic power branch. The ratio of the flow rate of the pump to the capacity of the hydrostatic motor yields the reduction ratio or conversion of the hydrostat.

The higher the power and the greater the conversion range, the larger the hydrostat must be. Although the hydrostats, especially large hydrostats, are good to regulate continuously, they have a poorer effectiveness and require a higher construction cost in comparison with mechanical transmissions. To keep the hydrostats small, the whole reduction ratio range of the transmission is divided by a multi-stage transmission into several forward and reverse drive ranges. In each drive range, the hydrostat passes through its whole adjustment range from maximum to minimum and vice versa. In the end positions, the shift elements to be engaged in the transmission attain synchronizer speed so that it is possible to shift smoothly. To this end as a rule are used force-locking, multi-disc clutches which can be shifted by the hydraulic actuation devices.

The hydrostat further reaches or passes through once in each range the zero position in which the whole power is mechanically transmitted with the best effectiveness. Therefore, transmissions are designed so that operating points in which the transmission is very often operated be in speed ranges of the transmission having a high mechanical transmission portion of power. By said steps and by numerous drive ranges, transmissions with favorable degrees of effectiveness are obtained. With the number of drive ranges and transmission stages, the number of clutch shift processes, of course, increases. Response or reaction and adjusting times of the hydraulic actuation devices result in long shift processes and in losses whereby the effectiveness is deteriorated.

With this background, the problem to be solved by the invention consists in altogether optimizing, especially abbreviating, the shift processes.

SUMMARY OF THE INVENTION

According to the invention, the problem is solved by the features of claim 1, while advantageous embodiments and developments of the invention can be understood from the subclaims.

Shift signals are usually triggered when a shift or synchronizer speed is attained, thereafter elapse a response or reaction time and an adjusting time until the shift elements are engaged. Therefore, a time interval exists between the triggering of the shift signals upon reaching the synchronizer speed and the actual shifting point whereby the shift process is unnecessarily prolonged and the whole effectiveness deteriorates.

According to the invention, the time interval between the triggering of the shift signals and the actual shift point is compensated by a control unit. The control unit triggers the shift signal around the time before the shift or synchronizer speed is reached so that the actual shift point preferably falls directly on the moment at which the synchronizer speed is attained. Thereby the shift process is shortened and the total effectiveness improved.

According to the invention, the reduction ratio or the moment when the shift signal must be triggered is determined according to the temporary change of the pivoting angle of a swash plate. It can be calculated with the following equation:

$$t_{sk} = t_{so} - \frac{\alpha_2 - \alpha_1}{t_2 - t_1} * K_k = t_{so} - \frac{d\alpha}{dt} * K_k$$

$t_{so}$=actual shift point
$t_{sk}$=moment to trigger the shift signal
$\alpha_2$, $\alpha_1$=plate angle at the $t_2$ or $t_1$ moment
$K_k$=adaptation factor In the hydraulic power branch there is likewise a response or reaction time often also designated as compensating time, between adjusting signal such as stop, start signal and signal of a swash plate etc. that changes the angular speed and the actual reaction of the hydraulic power branch. Specially in the case of the stop signal of a swash plate actuation this results in that the latter is adjusted past a target angle. Thereby results an excess of the hydrostat actuation or an unnecessary pressure peak in a hydrostat working circuit. Thereby energy is unnecessarily lost in the shifting process, structural parts such as seals are unnecessarily stressed. Furthermore, in order to achieve a smooth shift the reaction has to be interrupted by a hydrostat bypass valve.

It is proposed that the response and adjusting times or compensation times of the hydraulic branch be taken into account by a control unit. Specially in the stop signal of the swash plate actuation a signal is triggered around a corresponding time interval prior to reaching the target angle so that the swash plate adjusts exactly to the target angle after the signal. An excess of the hydrostat actuation is prevented and a smooth shifting is possible by means of a hydrostat bypass valve without traction interruption.

The moment when the signal must be triggered is calculated, preferably according to the temporary change of the pivot angle, meaning the angular speed, by the following equation:

$$t_\alpha = t_{\alpha_o} - \frac{\alpha_2 - \alpha_1}{t_2 - t_1} * k_\alpha = t_{\alpha_o} - \frac{d\alpha}{dt} * k_\alpha$$

$t_\alpha$=moment to trigger a stop signal of a swash plate actuation
$t\alpha_0$=theoretical moment to trigger a stop signal of a swash plate actuation
$\alpha_2$, $\alpha_1$=plate angle at the $t_2$ or $t_1$ moment
$k\alpha$=adaption factor In the specification and in the claims are shown and described in combination numerous features. The expert will conveniently regard the individual features and make added logical combination with them.

BRIEF DESCRIPTION OF THE DRAWING(S)

One embodiment of the invention is shown in the drawing wherein:

FIG. 3 is a curve of an adjusting signal in the course of time; and

FIG. 4 is a curve of an actual adjusting angle of a swash plate.

DESCRIPTION OF THE PREFERRED EMBODIMENT(S)

Figure 1:
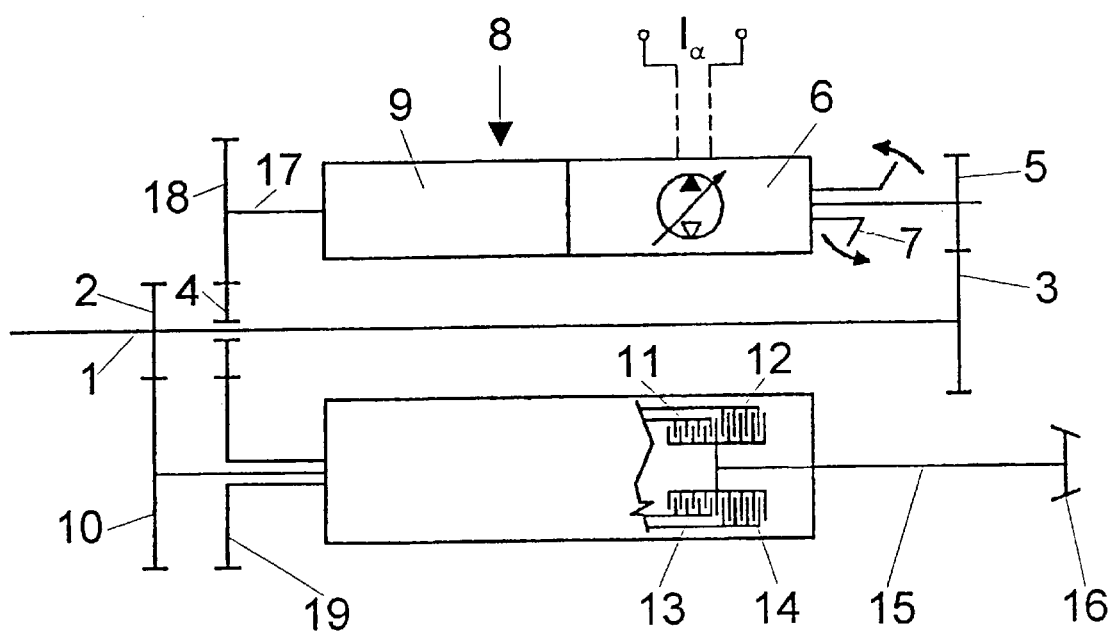
FIG. 1 is a diagrammatic representation of a continuously variable transmission.

FIG. 1 diagrammatically shows a continuously variable transmission driven by a prime mover (not shown) via an input shaft 1 upon which are firmly mounted two gears 2 and 3 and one other gear 4 is rotatably mounted.

The gear 3 drives, via one other gear 5, an hydraulic variable displacement pump 6 with a swash plate 7, the pivot angle $a$ of which determines the flow rate of the variable displacement pump 6. The swash plate 7 is electrically adjusted, its control current $\underline{T}$ being a measure for the pivot angle $\underline{a}$.

The variable displacement pump 6 belongs to a hydrostat 8 which, besides the variable displacement pump 6, has a hydromotor 9 and is a main component part of the hydraulic power branch.

The gear 2 drives a gear 10 at the input of a mechanical power branch (not shown in detail) to which belong a summarizing transmission and a hydraulically shifted mechanical transmission in planetary design. Transmissions with countershaft design can also be used. Gear clutches with discs for the transmission are designated with 11, 12, 13 and 14. They connect the transmission in the respective gears with an output shaft 15 upon which is mounted a drives system bevel gear 16.

The hydrostat 8 is operatively connected, via its output shaft 17, a gear 18, the gear 4 and one other gear 19 with the summarizing transmission.

The swash plate 7 and the gear clutches 11–14 are controlled by one or two control units (not shown in detail).

Figure 2:
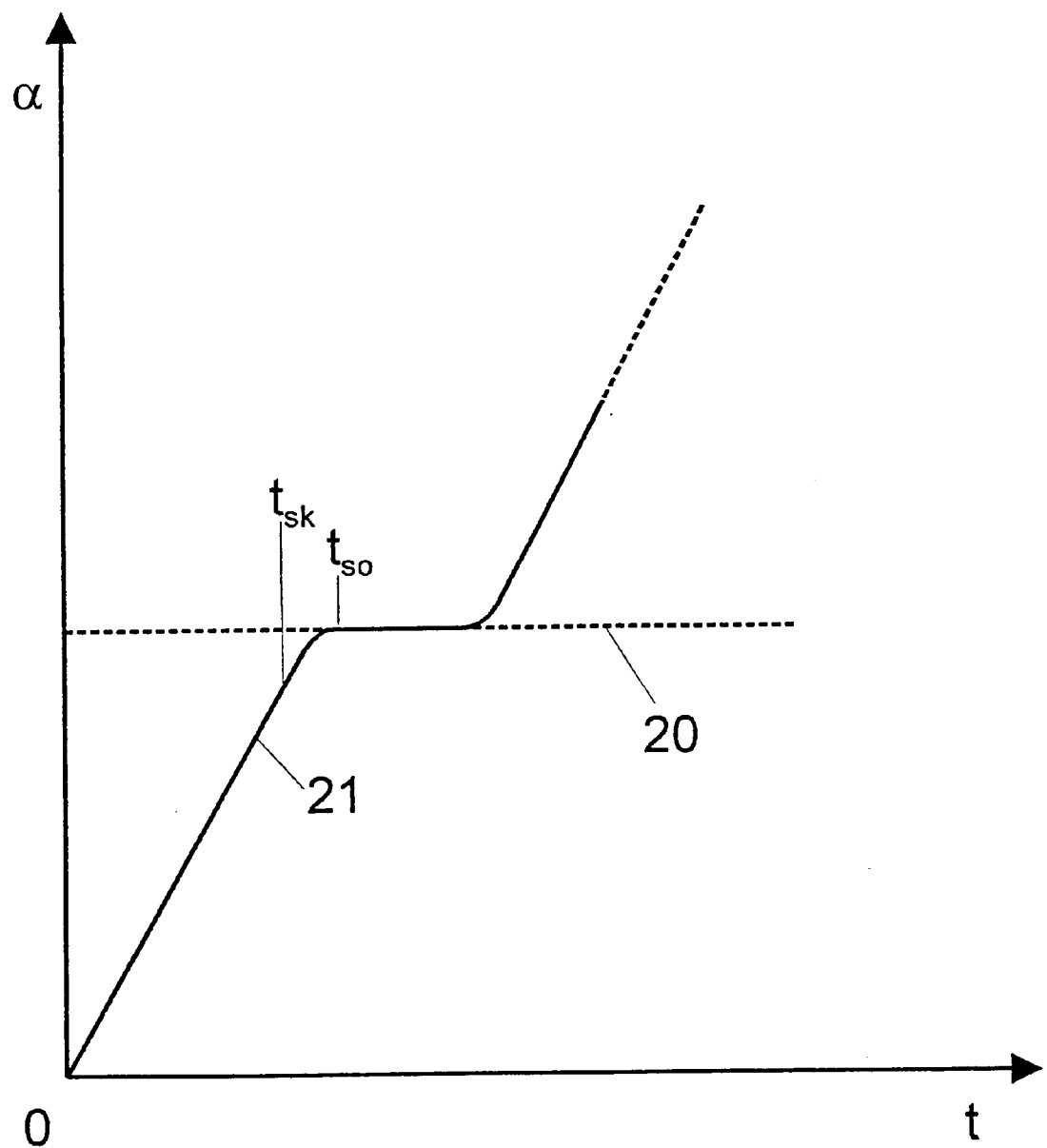
FIG. 2 is a curve of an adjusting angle of a swash plate in the course of time with a moment $t_{sk}$ for triggering a shift signal.

In FIG. 2 is an adjusting angle $a$ of the swash plate 7 plotted in the course of time a curve 21. At the $t_{sk}$ moment, a shift signal is triggered to engage one or several shift elements, i.e. the gear clutches with discs 11–14, so that a positive shift point $t_{so}$ is obtained when a synchronizer speed or a shift angle $\underline{a}$ 20 is reached.

In FIG. 3 is the curve 22 of a control signal plotted in the course of time. Directly thereunder is shown FIG. 4 for comparison a curve 23 of a swash plate 7 without control unit, according to the invention, and a curve 24 with one such control unit. It is to be noted that only after a certain time 25, the so-called compensating time, does the hydrostat 8 react to the control signal. If a stop signal is triggered at the $t_{ao}$ moment, a period of time likewise elapses until the swash plate 7 comes to a stop. If a target angle 26 is reached at the $t_{ao}$ moment, the swash plate 7 adjusts itself past the target angle 26. An excess 27 of the hydrostat actuation generates which detracts from the total effectiveness. To prevent this, it is proposed that a stop signal be triggered at a moment $t_a$ calculated by a control unit so that the swash plate 7 stops directly on the target angle 26, as is shown in the curve 24.

Reference numerals

| | | | |
|---|---|---|---|
| 1 | input shaft | 18 | gear |
| 2 | gear | 19 | gear |
| 3 | gear | 20 | shift angle |
| 4 | gear | 21 | curve |
| 5 | gear | 22 | curve |
| 6 | variable displacement pump | 23 | curve |
| 7 | swash plate | 24 | curve |
| 8 | hydrostat | 25 | time |
| 9 | hydromotor | 26 | target angle |
| 10 | gear | 27 | excess |
| 11 | gear clutch | $t_{sk}$ | moment to trigger a shift signal |
| 12 | gear clutch | $t_{so}$ | shift point |
| 13 | gear clutch | $t_\alpha$ | moment to trigger a stop signal |
| 14 | gear clutch | $t_{\alpha o}$ | moment to trigger a stop signal |
| 15 | output shaft | $\underline{T}$ | swash plate control current |
| 16 | drive system bevel gear | $\alpha$ | swash plate angle |
| 17 | output shaft | | |

What is claimed is:

1. A process for control of a continuously variable transmission comprising:

providing a hydrostatic transmission having a swash plate, providing a summarizing transmission, providing a multi-stage gear clutch with hydraulically actuatable force-locking shift elements (11–14), providing a control unit, adding together a mechanical power branch and an electronically controlled hydraulic power branch adjustable by a swash plate (7) in said summarizing transmission, using said control unit to control said shift elements (11–14) and said hydrostatic transmission, wherein
      said control unit triggering, prior to reaching in said transmission the shift or synchronizer speed needed for a shift point, a shift signal to shift said force-locking shift elements (11–14) so that the actual shift point falls directly on the moment at which the synchronizer speed for a shift is reached.

2. The process for control of a continuously variable transmission according to claim 1, comprising determining a moment ($t_{sk}$) for triggering a shift signal of said shift elements (11–14) in accordance with an angular speed of said swash plate (7).

3. The process for control of a continuously variable transmission according to claim 1, comprising determining a moment ($t_a$) for triggering a stop signal of said swash plate (7) in accordance with an angular speed of said swash plate (7).

* * * * *